J. JACKSON.
AUTOMATIC BABY CARRIAGE RUNNER.
APPLICATION FILED DEC. 21, 1918.
1,317,083.
Patented Sept. 23, 1919.
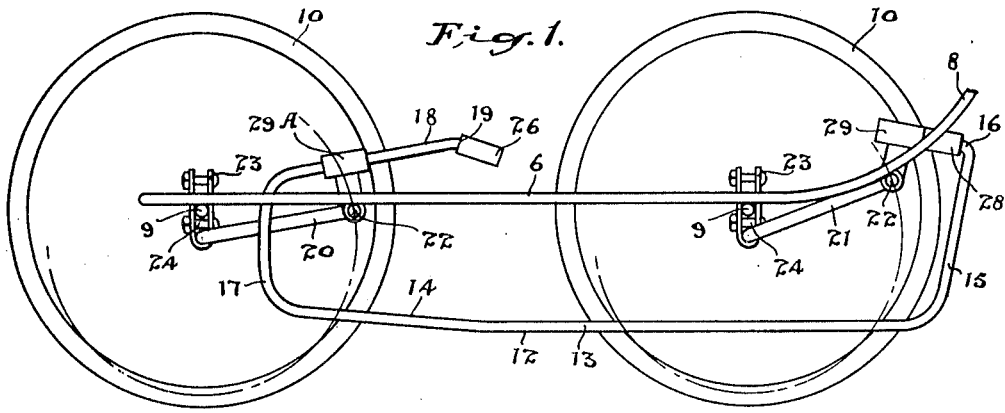
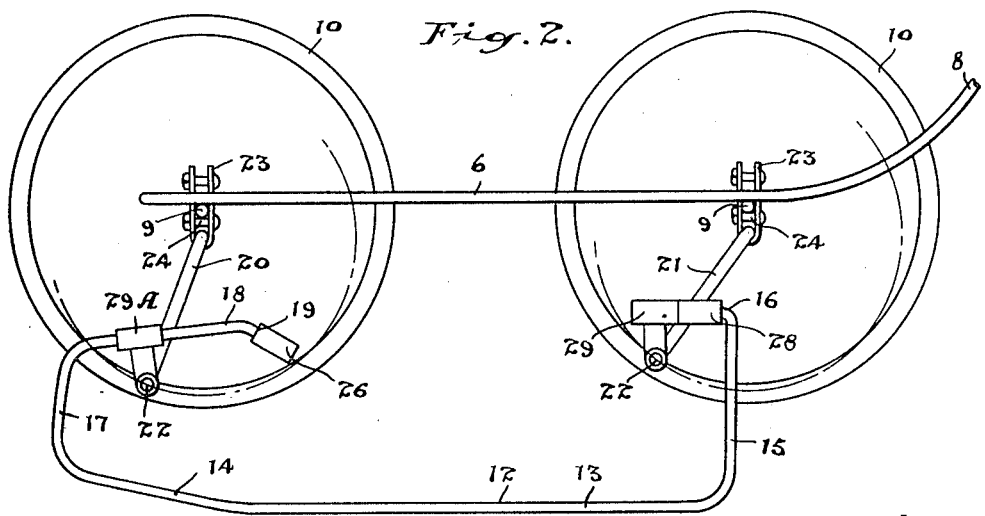
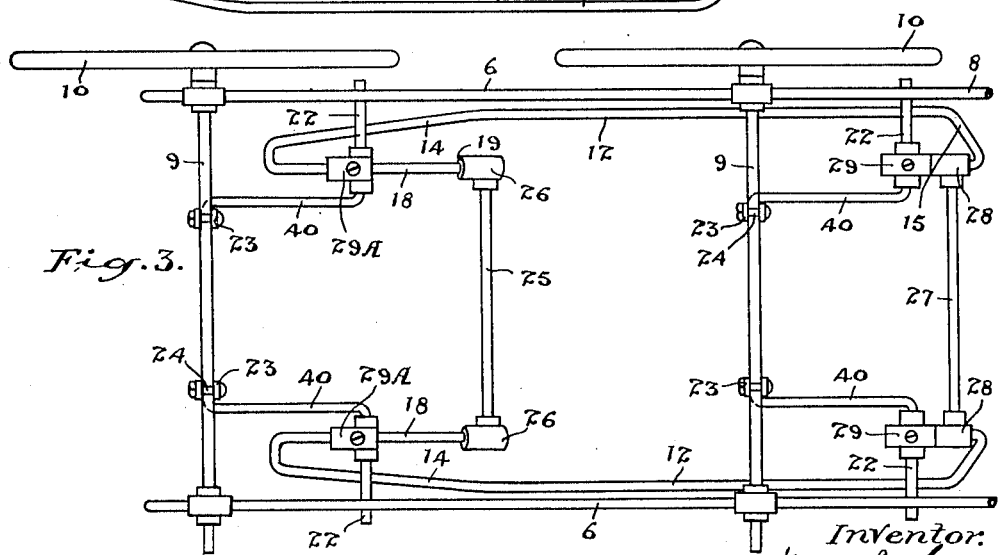

UNITED STATES PATENT OFFICE.

JAMES JACKSON, OF LONDON, ONTARIO, CANADA.

AUTOMATIC BABY-CARRIAGE RUNNER.

1,317,083.     Specification of Letters Patent.     Patented Sept. 23, 1919.

Application filed December 21, 1918. Serial No. 267,882.

*To all whom it may concern:*

Be it known that I, JAMES JACKSON, a subject of the King of Great Britain, and resident of the city of London, in the county of Middlesex, Province of Ontario, Canada, have invented certain new and useful Improvements in Automatic Baby-Carriage Runners, of which the following is a specification.

This invention relates to certain new and useful improvements in baby carriage runners and has for one of its objects the provision of a pair of runners which may be easily and quickly secured to a baby carriage, whereby the latter may be readily converted from a wheeled carriage into a sled, without necessitating the removal of the wheels from the carriage.

Another object of the invention is the provision of a pair of runners so connected together and to the axle of a carriage that the said runners may be raised or lowered without the use of springs, catches or like devices and will remain adjusted until again manually shifted.

A still further object of the invention is the provision of a pair of runners so connected to a carriage as to render it possible to instantly convert the carriage into a sled and vice versa.

A still further object of this invention is the provision of a device of this character which is simple, practical and comparatively inexpensive in construction and one which can be manufactured and sold at a low cost.

With these and other objects in view, the invention consists in certain novel features of construction, combination and arrangement of parts which will be hereinafter more fully described and claimed.

Figure 1 is a side elevational view with the sled runners in their raised and inoperative position, one pair of wheels being removed.

Fig. 2 is a side elevational view showing the sled runners in their lowered and operating position.

Fig. 3 is a plan view of a baby carriage chassis or running gear provided with my runner attachment.

In the drawings like numerals of reference indicate corresponding parts in the different figures.

The running gear is provided with the usual handle bars 8 extending up from the side bars 6 secured to the front and rear axles 9 with wheels 10 journaled thereon. The above described running gear is a well known type now on the market and to which my sled runners 12 are adapted to be attached.

As the construction of both of the runners is identical the description of one will serve for both. Each runner 12 is formed of resilient material and has a horizontally disposed ground-engaging portion 13, the forward end of which is inclined upwardly and forwardly as at 14 to provide a suitable inclined surface which permits the runners to be tilted forwardly, as will be more fully described.

The rear terminal of the runner is bent upwardly to provide a vertical standard 15, which standard has its end bent to provide a horizontally disposed bearing portion 16. The terminal of the inclined portion 14 is also provided with a vertical standard 17, which has its upper end bent to provide a horizontally disposed bearing portion 18. The bearing portions 16 and 18 are located on the same horizontal plane and extend toward each other in each runner. The end of the portion 18 is bent downwardly to provide a depending attaching member 19.

A front and rear hanger 20 and 21 respectively are provided of substantially U-shape, having arms 40. The ends of the arms 40 of the hangers are bent laterally in opposite directions to provide bearing members 22.

A plurality of U-shaped supporting bearings 23 are arranged in pairs and each pair is removably connected to the front and rear axle of the carriage by suitable fastening means such as bolts 24 or the like.

In the supporting bearings 23 are journaled the webs of the hangers 20 and 21 respectively, which webs rest in the bottoms of said bearings 23, it being understood that the arms of the U-shaped bearings 23 embrace the opposite sides of the axles and are held against turning movement thereon by the bolts 24. The webs of the hangers are journaled in the supporting bearings so that they may be swung parallel with or at right angles to the baby carriage body, which body it will be understood, is mounted in the usual manner upon the side bars 6.

A brace bar 25 is secured to the attaching members 19 of the runners by couplings 26, so that the swinging movement of the runners through the medium of the hangers will be simultaneous. The portion 16 at the rear end of the runner is also provided with a brace rod 27, which is connected thereto by suitable stationary T-couplings 28, the other end of this brace 27 being connected by a suitable stationary T-coupling 28 with the corresponding portion 16 of the adjacent runner 13, further insuring simultaneous movement of the runners.

The arms 40 of the rear hanger 21 are journaled to the projecting portions 16 of the rear of the runners by suitable couplings 29, while the arms of the front hanger 20 are journaled to the portions 18 of the runners by suitable adjustable T-couplings 29<sup>A</sup>. The points of connection between the runners and the couplings 29<sup>A</sup> may thus be varied.

It will be apparent from the foregoing description taken in connection with the connection with the accompanying drawing that the runners 12 are adjustably mounted upon the baby-carriage by the webs of the hangers 20, 21, being journaled in the bearings 23 and the bearings are detachably secured to the front and rear axles of the baby-carriage chassis, to mount the webs of the hangers 20, 21, at the required positions.

When it is desired to use the runners 12, it is only necessary to force them toward the ground-engaging position, for example, by pressing on the bar 27, and pulling rearwardly on the handles 8, thus forcing the runners and hangers into the position illustrated in Fig. 2 of the drawing, the weight of the carriage maintaining them in position by holding the cross bar 27 against the rear arms 40.

The bearing members 22 project beyond the couplings 29<sup>A</sup> and 29 and are adapted to engage the side bars 6 and handle bars 8 respectively, when the runners 12 are in raised position, thereby limiting the upward movement of the runners when raised from the ground to their inoperative position. These lateral projections 22 of the hangers 20, 21 are held engaging the handle bars 8 and side bars 6, when the runners are raised, by the resiliency of the runners 12, which prevents them from dropping accidentally.

The tensioning of the runners when raised is due to the fact that the points at which the hangers 20—21 are pivoted on the frame are slightly farther apart than the points of their pivotal connection to the runners, so that the runners spring a little in passing to the position shown in Fig. 1.

When it is desired to move the wheels into ground-engaging position, it is only necessary to lift upwardly on the handles, thus tilting the weight of the carriage upon the inclined portions 14 of the runners 12 while pushing forwardly on the carriage handle bars 8. The arms 40 then swing rearwardly and the runners can be manually raised into the position illustrated in Fig. 1, leaving the wheels in ground-engaging position.

The runners 12 are tensioned as the hangers 20 and 21 approach a horizontal position so that upon the further movement of the runners the same will snap into their inoperative position with the lateral projections 22 engaging the handle-bars 8 and the side bars 6, but the runners are not in tension when the hangers 20 and 21 are brought below a horizontal line and in their operative positions as indicated in Fig. 2 of the drawing. The couplings 29<sup>A</sup> are adjustably secured upon the portions 18 of the runners 12 by any suitable means such as that herein illustrated for accommodating the runners to carriage frames of slightly different length as well as for adjusting the tension of the runners 12 by carrying the distance between the lateral projections 22 of the hangers 20 and 21.

What I claim as my invention is:—

1. The combination with the running gear of a wheeled vehicle of a pair of resilient runners; and front and rear hangers pivotally connected to the runners and stationary parts of the running gear, the distance between the pivot points of the hangers on the running gear being greater than the distance between the pivot points of the hangers on the runners.

2. The combination with the running gear of a wheeled vehicle of a pair of runners; and front and rear hangers pivotally connected to the runners and stationary parts of the running gear, the distance between the pivot points of the hangers on the running gear being greater than the distance between the pivot points of the hangers on the runners, provision being made for a resilient yielding movement to permit of the distance between the pivot points of the hangers on the runner becoming equal to the distance between the pivot points of the hangers on the running gear, plus the length of one hanger and minus the length of the other hanger whereby the runners being moved to positions with their hanger pivots above or below the pivot points of the hangers on the running gear.

3. A vehicle constructed as set forth in claim 1 in which a cross bar is secured to the upper horizontal parts of the rear ends of the runners adapted to engage the rear hanger when the runners are in operative position.

4. A vehicle constructed as set forth in claim 1 in which the pivot ends of the hangers extend laterally through their bearings on the runners to form stops to engage stationary parts of the running gear to limit the upward movement of the runners.

5. A vehicle constructed as set forth in claim 3 provided also with a cross bar secured to the upper horizontal parts of the rear ends of the runners behind the pivotal connections of the rear hanger to the runners.

In testimony whereof I have signed in the presence of the two undersigned witnesses.

JAMES JACKSON.

Witnesses:
P. J. EDMUNDS,
M. A. EDMUNDS.

Copies of this patent may be obtained for five cents each, by addressing the "Commissioner of Patents, Washington, D. C."